United States Patent
Otsuka et al.

(10) Patent No.: US 10,165,045 B2
(45) Date of Patent: Dec. 25, 2018

(54) INFORMATION PROCESSING APPARATUS, SYSTEM, METHOD, AND COMPUTER READABLE MEDIUM

(71) Applicant: FUJITSU LIMITED, Kawasaki-shi, Kanagawa (JP)

(72) Inventors: Masato Otsuka, Kawasaki (JP); Akira Satou, Kawasaki (JP); Tooru Yamamoto, Yokohama (JP); Masahiro Sato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 223 days.

(21) Appl. No.: 15/140,899

(22) Filed: Apr. 28, 2016

(65) Prior Publication Data

US 2016/0344804 A1 Nov. 24, 2016

(30) Foreign Application Priority Data

May 20, 2015 (JP) .................................. 2015-103197

(51) Int. Cl.
*G06F 15/173* (2006.01)
*H04L 29/08* (2006.01)
*H04L 12/26* (2006.01)

(52) U.S. Cl.
CPC ...... *H04L 67/1008* (2013.01); *H04L 43/0817* (2013.01)

(58) Field of Classification Search
CPC ............... G06F 9/5083; G06F 11/3433; G06F 11/3442; G06F 2201/81; G06F 9/505; H04L 47/822; H04W 28/08

USPC .......................................... 709/226, 232, 241
See application file for complete search history.

(56) References Cited

U.S. PATENT DOCUMENTS

| | | | |
|---|---|---|---|
| 7,500,001 B2 * | 3/2009 | Tameshige | G06F 9/5011 709/223 |
| 2003/0069972 A1 * | 4/2003 | Yoshimura | H04L 12/4645 709/226 |
| 2004/0111508 A1 * | 6/2004 | Dias | H04L 29/06 709/224 |
| 2005/0188075 A1 * | 8/2005 | Dias | H04L 67/1008 709/224 |
| 2006/0036724 A1 | 2/2006 | Iizuka et al. | |
| 2008/0104608 A1 * | 5/2008 | Hyser | G06F 9/5027 718/105 |

(Continued)

FOREIGN PATENT DOCUMENTS

| | | |
|---|---|---|
| JP | 2000-137692 | 5/2000 |
| JP | 2005-4676 | 1/2005 |

(Continued)

*Primary Examiner* — Phuoc H Nguyen
(74) *Attorney, Agent, or Firm* — Oblon, McClelland, Maier & Neustadt, L.L.P.

(57) ABSTRACT

An information processing apparatus includes: a memory; and a processor coupled to the memory and configured to: receive, from each of a plurality of data centers located in a plurality of positions, load information pertaining to a load of each data center; calculate an estimated load value for each of the plurality of data centers based on the received load information; determine a data center to execute a requested process based on the estimated load value and a time zone of the position where each of the plurality of data centers is located; and control the determined data center to execute the requested process.

18 Claims, 11 Drawing Sheets

(56) References Cited

U.S. PATENT DOCUMENTS

| | | | |
|---|---|---|---|
| 2009/0150565 A1* | 6/2009 | Grossner | G06F 9/468 709/241 |
| 2010/0095004 A1* | 4/2010 | Zuckerman | H04L 67/1008 709/226 |
| 2013/0031550 A1* | 1/2013 | Choudhury | G06F 9/45558 718/1 |
| 2013/0080617 A1* | 3/2013 | Driesen | H04L 43/0876 709/224 |
| 2013/0289785 A1* | 10/2013 | Takahashi | G06Q 50/06 700/286 |
| 2013/0318521 A1* | 11/2013 | Monaghan | H04L 63/107 718/1 |
| 2016/0070601 A1* | 3/2016 | Yamamoto | G06F 9/5088 718/105 |
| 2016/0127204 A1* | 5/2016 | Ozaki | H04L 43/04 709/224 |
| 2016/0237160 A1* | 8/2016 | Votsmeier | A61K 47/48384 |

FOREIGN PATENT DOCUMENTS

| | | |
|---|---|---|
| JP | 2006-18710 | 1/2006 |
| JP | 2011-76469 | 4/2011 |

* cited by examiner

FIG. 3

| DATA CENTER NAME | JAPAN | | | | | CHINA | | | | | GERMANY | | | | | UNITED STATES | | | | |
|---|---|---|---|---|---|---|---|---|---|---|---|---|---|---|---|---|---|---|---|---|
| NUMBER OF POSSIBLE USERS | 12000 | | | | | 5000 | | | | | 8000 | | | | | 10000 | | | | |
| NUMBER OF CURRENT USERS | 8000 | | | | | 1500 | | | | | 5500 | | | | | 7000 | | | | |
| LATENCY [MSEC] AND NUMBER OF USERS PER TASK | TASK NAME | NO. OF USERS | LATENCY | | | TASK NAME | NO. OF USERS | LATENCY | | | TASK NAME | NO. OF USERS | LATENCY | | | TASK NAME | NO. OF USERS | LATENCY | | |
| | | | JAPAN | CHINA | GER | US | | | JAPAN | CHINA | GER | US | | | JAPAN | CHINA | GER | US | | | JAPAN | CHINA | GER | US |
| | TASK A (JAPAN) | 2000 | 1.0 | 2.0 | 7.0 | 8.0 | TASK F (JAPAN) | 1000 | 1.0 | 2.0 | 7.0 | 8.0 | TASK H (GER.) | 3000 | 7.0 | 6.0 | 1.0 | 5.0 | TASK K (US) | 3000 | 8.0 | 9.0 | 5.0 | 1.0 |
| | TASK B (JAPAN) | 1800 | 1.0 | 2.0 | 7.0 | 8.0 | TASK G (CHINA) | 500 | 2.0 | 1.0 | 6.0 | 9.0 | TASK I (GER.) | 1500 | 7.0 | 6.0 | 1.0 | 5.0 | TASK L (US) | 2000 | 8.0 | 9.0 | 5.0 | 1.0 |
| | TASK C (JAPAN) | 1600 | 1.0 | 2.0 | 7.0 | 8.0 | | | | | | | TASK J (JAPAN) | 1000 | 1.0 | 2.0 | 7.0 | 8.0 | TASK M (GER.) | 2000 | 7.0 | 6.0 | 1.0 | 5.0 |
| | TASK D (INDIA) | 1400 | 4.0 | 2.0 | 5.0 | 10.0 | | | | | SWITCH | | | | | | | | | | | | | |
| | TASK E (UK) | 1200 | 8.0 | 7.0 | 2.0 | 4.0 | | | | | | | | | | | | | | | | | | |
| SERVER CPU ACTIVITY RATE [%] | 90 | | | | | 50 | | | | | 50 | | | | | 50 | | | | |
| SERVER MEMORY ACTIVITY RATE [%] | 90 | | | | | 50 | | | | | 50 | | | | | 50 | | | | |
| STORAGE CONTROLLER BUSY RATE [%] | 50 | | | | | 50 | | | | | 50 | | | | | 50 | | | | |
| STORAGE DISK BUSY RATE [%] | 50 | | | | | 50 | | | | | 50 | | | | | 50 | | | | |
| BUSY TENDENCY | 10 | | | | | 7 | | | | | 5 | | | | | 2 | | | | |

FIG. 4

| DATA CENTER NAME | JAPAN | CHINA | GERMANY | UNITED STATES |
|---|---|---|---|---|
| DC INDEX | SWITCHING SOURCE | SWITCHING DESTINATION | | |
| | INDEX | INDEX (DIFFERENCE) | INDEX (DIFFERENCE) | INDEX (DIFFERENCE) |
| TASK A | 28.0 | 32.7 -(4.7) | 47.7 -(19.7) | 20.6 (7.4) |
| TASK B | 28.0 | 30.8 -(2.8) | 46.5 -(18.5) | 20.1 (7.9) |
| TASK C | 28.0 | 28.9 -(0.9) | 45.2 -(17.2) | 19.7 (8.3) |
| TASK D | 112.0 | 27.1 (84.9) | 31.4 (80.6) | 24.0 (88.0) |
| TASK E | 224.0 | 88.2 (135.8) | 12.2 (211.8) | 9.4 (214.6) |

FIG. 5

| DATA CENTER NAME | JAPAN | CHINA | GERMANY | UNITED STATES |
|---|---|---|---|---|
| TIME | 8:00 | 7:00 | 0:00 | 18:00 |
| TIME ZONE PRIORITY LEVEL | 4 | 1 | 2 | 3 |

FIG. 8

| DATA CENTER NAME | JAPAN | | | | |
|---|---|---|---|---|---|
| NUMBER OF POSSIBLE USERS | 12000 | | | | |
| NUMBER OF CURRENT USERS | 8000 | | | | |
| LATENCY [MSEC] AND NUMBER OF USERS PER TASK | TASK NAME | NO. OF USERS | LATENCY | | | |
| | | | JAPAN | CHINA | GER | US |
| | TASK A (JAPAN) | 2000 | 1.0 | 2.0 | 7.0 | 8.0 |
| | TASK B (JAPAN) | 1800 | 1.0 | 2.0 | 7.0 | 8.0 |
| | TASK C (JAPAN) | 1600 | 1.0 | 2.0 | 7.0 | 8.0 |
| | TASK D (INDIA) | 1400 | 4.0 | 2.0 | 5.0 | 10.0 |
| | TASK E (UK) | 1200 | 8.0 | 7.0 | 2.0 | 4.0 |
| SERVER CPU ACTIVITY RATE [%] | 90 | | | | |
| SERVER MEMORY ACTIVITY RATE [%] | 90 | | | | |
| STORAGE CONTROLLER BUSY RATE [%] | 50 | | | | |
| STORAGE DISK BUSY RATE [%] | 50 | | | | |
| BUSY TENDENCY | 10 | | | | |

US 10,165,045 B2

INFORMATION PROCESSING APPARATUS, SYSTEM, METHOD, AND COMPUTER READABLE MEDIUM

CROSS-REFERENCE TO RELATED APPLICATION

This application is based upon and claims the benefit of priority of the prior Japanese Patent Application No. 2015-103197, filed on May 20, 2015, the entire contents of which are incorporated herein by reference.

FIELD

The embodiment discussed herein relates to an information processing apparatus, a system, a method, and a computer readable medium.

BACKGROUND

Conventionally, an information processing system configured of a plurality of data centers is provided. This type of information processing system is provided with a technique for selecting a data center that is the closest base as an access destination data center to be used by a user.

Moreover, a technique is known in the prior art in this type of information processing system for distributing loads by switching the access destination to another data center when the data center to be used by the user is under a heavy load. The above point is described with reference to FIG. 11. FIG. 11 illustrates an example of an information processing system. As illustrated in FIG. 11, an information processing system 1000 has a control center 1100, a data center DC-X, a data center DC-Y, a data center DC-Z, and a user terminal 1200. In the example illustrated in FIG. 11, the control center 1100 first detects that a heavy load has occurred in the data center DC-X that is currently used for "task A" by a user (S11). The control center 1100 then switches the access destination to the data center DC-Y which is the closest base to the user terminal 1200 among the other data centers DC-Y and DC-Z (S12).

Examples of the prior art include Japanese Laid-open Patent Publication No. 2000-137692, Japanese Laid-open Patent Publication No. 2005-4676, Japanese Laid-open Patent Publication No. 2011-76469, and Japanese Laid-open Patent Publication No. 2006-18710.

However, when switching the access destination to the closest data center, the data center that is the destination of the switching may have a heavy load. For example, a data center may be in a time zone in which the number of users using the data center is high. The system load on the data center that is the destination of the switching may become heavier during a time zone in which the number of users using the data center is high.

SUMMARY

According to an aspect of the invention, an information processing apparatus includes: a memory; and a processor coupled to the memory and configured to: receive, from each of a plurality of data centers located in a plurality of positions, load information pertaining to a load of each data center; calculate an estimated load value for each of the plurality of data centers based on the received load information; determine a data center to execute a requested process based on the estimated load value and a time zone of the position where each of the plurality of data centers is located; and control the determined data center to execute the requested process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a data configuration of data center information;

FIG. 4 illustrates an example of a data configuration of index information;

FIG. 5 illustrates an example of a data configuration of time zone information;

FIG. 8 illustrates an example of a data configuration of data center information;

DESCRIPTION OF EMBODIMENT

An object of one aspect of the present embodiment is to provide an information processing apparatus, a system, and a method that can suppress a reduction in the performance of a data center that is a switching destination.

An embodiment of an information processing apparatus, an information processing program, and a data center system disclosed herein will be explained in detail with reference to the drawings. The present embodiment applies to a data center system that includes a plurality of data centers that provide virtual machines. The present disclosure is not limited to the embodiment disclosed herein. Various embodiments may be combined within the limitations of consistency of the contents of the processing.

[Configuration of Data Center System According to the Embodiment]

Figure 1:
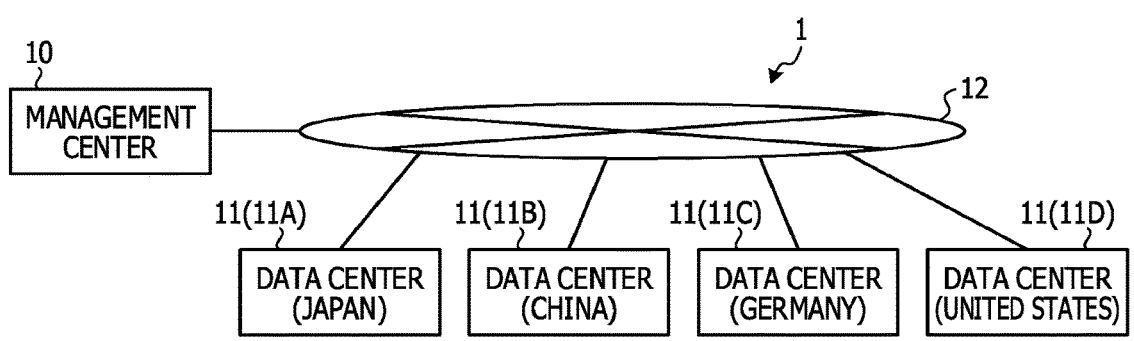
FIG. 1 illustrates a hardware configuration of a data center system according to an embodiment.

FIG. 1 illustrates a hardware configuration of a data center system according to an embodiment. As illustrated in FIG. 1, a data center system 1 has a management center 10 and a plurality of data centers (DC) 11. The management center 10 and the plurality of data centers 11 are connected through a network 12. Dedicated lines are used, for example, in the network 12. While four data centers 11 (11A, 11B, 11C, 11D) are depicted in FIG. 1, the number of data centers may be any number equal to or greater than two. Hereinbelow, the data centers 11A, 11B, 11C, and 11D may be referred to as the data center 11 when discussing the data centers without differentiation.

The management center 10 manages the plurality of data centers 11. For example, the management center 10 switches a data center that is an access destination to be used by a user, in response to a load applied to each data center 11 and in response to the time zones of the positions where each data center 11 is located. The management center 10 may be integrated with any of the data centers 11.

The data centers 11 are located in positions which are geographically spaced away from each other. The data centers 11 in the present embodiment are located in different regions such as in different countries. For example, the data centers 11A, 11B, 11C, and 11D are respectively located in Japan, China, Germany, and the United States. While the four data centers 11A, 11B, 11C, and 11D are respectively located in Japan, China, Germany, and the United States in the present embodiment, two or more of the data centers 11 may be located in the same area.

[Hardware Configuration of Management Center]

Figure 2:
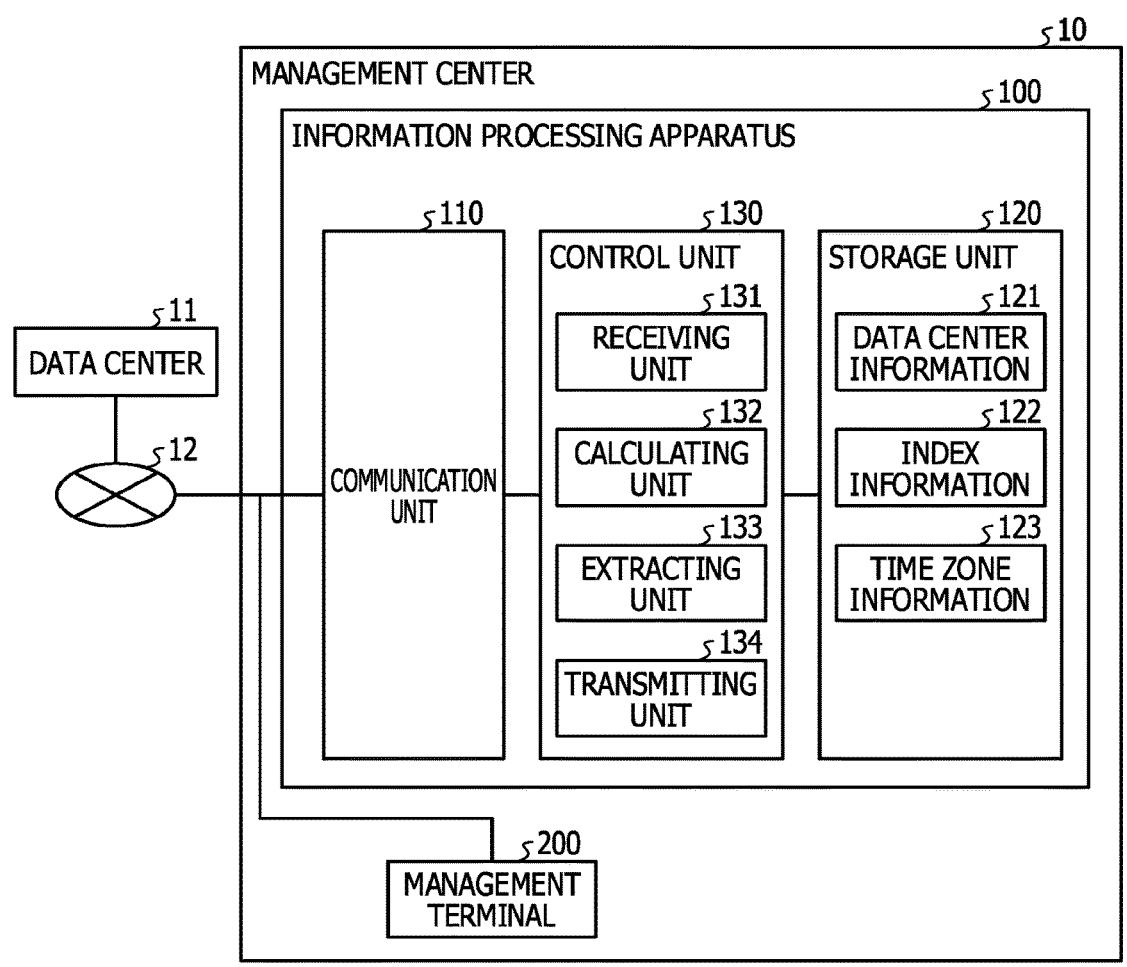
FIG. 2 illustrates a functional configuration of a management center according to the embodiment.

Next, a functional configuration of the management center 10 will be explained with reference to FIG. 2. FIG. 2 illustrates a functional configuration of the management center according to the embodiment.

The management center 10 has an information processing apparatus 100 and a management terminal 200. The information processing apparatus 100 and the management terminal 200 are connected over a network inside the management center 10 for example and are able to communicate with each other. The network inside the management center 10 is connected in a communicable manner to the network 12 thus enabling communication with the data center 11 through the network 12. While one information processing apparatus 100 is depicted in the example in FIG. 2, there may be two or more information processing apparatuses 100.

The information processing apparatus 100 is a device for providing information pertaining to the data center that is the access destination suited to a user in response to the loads on the data centers 11 and in response to the time zones where the data centers 11 are located. For example, the information processing apparatus 100 calculates estimated load values applied to each data center 11 and extracts the data center that is the switching destination based on the estimated values and the time zones where the data centers 11 are located. An example is discussed below in which the information processing apparatus 100 switches the data center 11A currently being used by a user to another data center.

The management terminal 200 is realized, for example, by a desktop personal computer (PC) or by a notebook PC, a tablet terminal, a mobile telephone, or a personal digital assistant (PDS) and the like. For example, the management terminal 200 is used by an operator who performs the work for switching the data centers 11 used by the users. Hereinbelow, the management terminal 200 may be referred to as an administrator. That is, the administrator may be understood as the management terminal 200 hereinbelow.

[Configuration of Information Processing Apparatus]

Next, an explanation of the information processing apparatus 100 according to the first embodiment will be provided. As illustrated in FIG. 2, the information processing apparatus 100 has a communication unit 110, a storage unit 120, and a control unit 130. The information processing apparatus 100 may have other functional units that are provided beforehand in a computer in addition to the functional units depicted in FIG. 2. For example, the information processing apparatus 100 may have a display unit for displaying various types of information and an input unit for inputting various types of information.

The communication unit 110 is realized, for example, by a network interface card (NIC) and the like. The communication unit 110 is connected by a wire or wirelessly to the network 12 for example. The communication unit 110 transmits and receives information to and from the data center 11 over the network 12. Moreover, the communication unit 110 transmits and receives information to and from the management terminal 200 over a network inside the management center 10 for example.

The storage unit 120 is a storage device for storing various types of data. For example, the storage unit 120 is a storage device such as a hard disk, a solid state drive (SSD), or an optical disk and the like. The storage unit 120 may be a semiconductor memory that allows data to be rewritten such as a random access memory (RAM), a flash memory, or a non-volatile static random access memory (NVSRAM).

The storage unit 120 stores an operating system (OS) and various types of programs that are executed by the control unit 130. For example, the storage unit 120 stores various types of programs including a program for executing a process to extract a data center that is a switching destination as described below. Moreover, the storage unit 120 stores various types of data to be used by the programs executed by the control unit 130. The storage unit 120 according to the present embodiment stores data center information 121, index information 122, and time zone information 123.

The data center information 121 is data for storing information pertaining to the plurality of data centers 11 in the data center system 1. For example, numbers of possible users that can use each data center, numbers of current users currently using each data center, latencies, server activity rates, storage busy rates, and information indicating tendencies for busy states are stored in the data center information 121.

FIG. 3 illustrates an example of a data configuration of data center information. As illustrated in FIG. 3, the data center information 121 has fields such as "data center name", "number of possible users", "number of current users", "number of users per task", and "latency per task". The data center information 121 also includes fields such as "server CPU activity rate", "server memory activity rate", "storage controller busy rate", "storage disk busy rate", and "busy tendency".

The data center name field is a region for storing identification information for identifying the plurality of data centers 11 in the data center system 1. For example, the name of the country where the data center 11 is located is stored as the identification information in the data center name field. Various types of information that can identify a data center such as an identification ID attributed to each data center 11 may be stored in the data center name field. The field for the number of possible users is a region for storing the number of users that can use the data center 11. The field for the number of current users is a region for storing the number of users that are currently using the data center. The field for the number of users per task is a region for storing the number of users that are currently using each task. The field for the latency per task is a region for storing the communication time period on a path when communicating with another data center 11 for each task. For example, a response time with respect to a request to another data center 11 is stored in the latency per task field. For example, latency is set based on the distance between the data centers. In one example, latency is set to a value that increases in correspondence to a greater distance between the data centers.

The server CPU activity rate field is a region for storing the usage condition of the CPU provided in a server in the data center 11. The server memory activity rate field is a region for storing the usage condition of the memory provided in a server in the data center 11. The storage controller busy rate field is a region for storing the busy rate of the controller provided in a storage in the data center 11. The storage disk busy rate field is a region for storing the busy rate of the disk provided in the storage in the data center 11. The fields "server CPU activity rate", "server memory activity rate", "storage controller busy rate", and "storage disk busy rate" are stored as values from zero to one hundred for example. The busy tendency field is a region for storing an index indicating the tendency of the data center 11 to enter a busy state. For example, an index is stored that is a value that increases as the data center 11 becomes more likely to enter a busy state based on statistical information of past performance in entering the busy state.

In the example in FIG. 3, the number of possible users of the data center 11A that is located in "Japan" is indicated as "12000". Moreover, the number of current users of the data center 11A that is located in "Japan" is indicated as "8000". The number of current users of the "task (A)" of the data center 11A that is located in "Japan" is indicated as "2000". The text in parentheses beside the task name indicates the country where the task is performed. For example, "Task A (Japan)" indicates that the task A is performed in Japan. The latency between the data center 11A located in "Japan" and the data center 11B located in "China" is indicated as "2.0". Moreover, the server CPU activity rate of the data center 11A that is located in "Japan" is indicated as "90%". The server memory activity rate of the data center 11A that is located in "Japan" is indicated as "90%". The storage controller busy rate of the data center 11A that is located in "Japan" is indicated as "50%". The storage disk busy rate of the data center 11A that is located in "Japan" is indicated as "50%". The busy tendency of the data center 11A that is located in "Japan" is indicated as "10".

The index information 122 is data for storing information pertaining to an estimated load value applicable to the plurality of data centers 11 in the data center system 1. For example, an index which indicates an estimated load value applicable to the data center 11 for each task is stored in the data center information 121.

FIG. 4 illustrates an example of a data configuration of index information. As illustrated in FIG. 4, the index information 122 has fields such as "data center name", and "task A" to "task E". The data center name field is a region for storing identification information for identifying the plurality of data centers 11 in the data center system 1. The fields "task A" to "task E" are regions for storing "DC indexes" for the tasks A to E processed by the data center 11. The "DC index" is an index for indicating an estimated load value applied to the data center 11 due to the tasks. The value of a difference derived by subtracting the DC index of the data center 11 that is a candidate for a switching destination data center other than the switching source data center, from the DC index of the switching source data center 11, is also stored in the fields "task A" to "task E".

In the example in FIG. 4, the data center 11A that is located in "Japan" is indicated as the switching source data center. Moreover, the DC index of the "task (A)" of the data center 11A that is located in "Japan" is indicated as "28.0". The data centers 11B to 11D which are respectively located in "China", "Germany", and "United States" are indicated as candidates for the data center 11 switching destination. The DC index of the "task A" for the data center 11B located in "China" is indicated as "32.7". The difference between the DC index of the "task A" for the data center 11A located in "Japan" and the DC index for the data center 11B located in "China" is indicated as "−4.7".

The time zone information 123 is data for storing information pertaining to the time period of the position where the data center 11 is located. For example, information such as the time of the position where the data center 11 is located and a priority level of the data center 11 based on the applicable time, is stored in the time zone information 123.

FIG. 5 illustrates an example of a data configuration of time zone information. As illustrated in FIG. 5, the time zone information 123 has fields such as "data center name", "time", and "time zone priority level". The data center name field is a region for storing identification information for identifying the plurality of data centers 11 in the data center system 1. The "time" field is a region for storing the current time at the position where the data center 11 is located. The current time at the position where the data center 11 is located is updated in real time and stored in the "time" field. The "time zone priority level" field is a region for storing the priority level of the data center 11 in accordance with the current time at the position where the data center 11 is located. For example, the "time zone priority level" is set as a value that decreases as the priority level of a data center located in a position with a time zone in which the number of users is small increases. For example, the "time zone priority level" is defined by dividing the time period of one day into n portions. As one example, the "time zone priority level" is derived by dividing one day into four portions that include an early morning time from 4:00 to 8:00, a daylight time from 8:00 to 17:00, an evening time from 17:00 to 22:00, and a late night time from 22:00 to 4:00. In this case, the priority levels are defined in order from the highest as "1" for the early morning time, "2" for the late night time, "3" for the evening time, and "4" for the daylight time.

In the example in FIG. 5, the current time of the data center 11A that is located in "Japan" is indicated as "8:00". Moreover, because the current time of the data center 11A that is located in "Japan" is indicated as "8:00", the time zone priority level is indicated as "4".

Returning to FIG. 2, the control unit 130 is a device for controlling the information processing apparatus 100. An electronic circuit such as a central processing unit (CPU) or a micro processing unit (MPU), or an integrated circuit such as an application specific integrated circuit (ASIC) or a field programmable gate array (FPGA) may be used as the control unit 130. The control unit 130 has an internal memory for storing control data and programs that prescribe various operating procedures, and the control unit 130 executes various types of processing using the control data and the programs. The control unit 130 functions as various types of processors due to the operations of the various types of programs. For example, the control unit 130 has a receiving unit 131, a calculating unit 132, an extracting unit 133, and a transmitting unit 134.

The receiving unit 131 receives information pertaining to loads from each of the plurality of data centers 11 located in a plurality of positions. For example, the receiving unit 131 receives the number of possible users, the number of current users, the busy tendency, the CPU activity rate and the memory activity rate of the server, the controller busy rate and the disk busy rate of the storage, and the number of users and the latency of the applicable task of the data center 11. For example, the receiving unit 131 periodically receives the information pertaining to the loads of each of the plurality of data centers 11 at predetermined intervals. The receiving unit 131 then stores the received information pertaining to the loads in the storage unit 120 in association with the data center name of the data center 11. Moreover, the receiving unit 131 receives information indicating the fact that the data center 11 has a heavy load from the data center 11.

The calculating unit 132 calculates the estimated load value applied to the data center 11 based on the information pertaining to the loads received by the receiving unit 131. For example, the calculating unit 132 calculates the estimated load value based on a delay time of the data center, the server activity rate, the busy rate of the storage, or the tendency to enter the busy state. For example, the calculating unit 132 calculates the estimated load value for each data center using the data center information 121 stored in the storage unit 120. For example, the calculating unit 132 calculates the DC index as the estimated load value for each task processed by the data center 11 that is the switching source. The DC index of the data center 11 that is the switching source and the DC index of the data center 11 that is the switching destination are calculated using different methods. As an example, the calculating unit 132 calculates a source indicator (SI) that is the "DC index" of the data center 11 that is the switching source by using the data center information 121 stored in the storage unit 120 to compute the following equation (1).

$$SI = LA \times (1 + SCPU/100 + SMEM/100 + SCON/100 + SDIS/100) \times BT \quad (1)$$

Latency (LA) indicates the latency of the task to be switched. The source CPU (SCPU) indicates the server CPU activity rate in the data center 11 that is the switching source. The source memory (SMEM) indicates the server memory activity rate in the data center 11 that is the switching source. The source controller (SCON) indicates the storage controller busy rate in the data center 11 that is the switching source. The source disk (SDIS) indicates the storage disk busy rate in the data center 11 that is the switching source. The SCPU, SMEM, SCON, and SDIS here are represented by values from zero to one hundred. The busy transition (BT) indicates the busy tendency. The calculating unit 132 uses "0" when the SCPU and the SMEM are less than a predetermined threshold (e.g., 80). Moreover, the calculating unit 132 uses "0" when the SCON and the SDIS are less than a predetermined threshold (e.g., 70). In the example in FIG. 4, the calculating unit 132 arrives at a DC index of "28.0" for the "task A" processed by the data center 11A that is the switching source data center and has the data center name of "Japan".

Further, the calculating unit 132 calculates a destination indicator (DI) that is the "DC index" of the data center 11 that is the switching destination by using the data center information 121 stored in the storage unit 120 to compute the following equation (2).

$$DI = LA \times (1 + DCPU/100 + DMEM/100 + DCON/100 + DDIS/100) \times ((DU + SU)/DU) \times BT \quad (2)$$

The destination CPU (DCPU) is the server CPU activity rate in the data center 11 that is the switching destination. The destination memory (DMEM) indicates the server memory activity rate in the data center 11 that is the switching destination. The destination controller (DCON) indicates the storage controller busy rate in the data center 11 that is the switching destination. The destination disk (DDIS) indicates the storage disk busy rate in the data center 11 that is the switching destination. The DCPU, DMEM, DCON, and DDIS here are represented by values from zero to one hundred. The destination users (DU) indicates the number of current users of the data center 11 that is the switching destination. The source users (SU) is the number of users to the task to be used in the data center 11. The calculating unit 132 uses "0" when the DCPU and the DMEM are less than a predetermined threshold (e.g., 80). Moreover, the calculating unit 132 uses "0" when the DCON and the DDIS are less than a predetermined threshold (e.g., 70). In the example in FIG. 4, the calculating unit 132 arrives at the DC index of "32.7" when the processing of the "task A" is switched to the data center 11 that is the switching destination data center and has the data center name of "China".

Moreover, the calculating unit 132 calculates the value of the difference between the DC index of the data center 11 that is the switching destination candidate and the DC index of the data center 11 that is the switching source. In the example in FIG. 4, the calculating unit 132 arrives at "−4.7" when the DC index "32.7" of the "China" data center 11B is subtracted from the DC index "28.0" of the "Japan" data center 11A.

The calculating unit 132 stores the calculated estimated load values in the storage unit 120. For example, the calculating unit 132 stores the DC index of the data center 11 that is the switching source and the DC index of the data center 11 that is the switching destination in the index information 122 in association with the data center names. Moreover, the calculating unit 132 stores the value of the difference derived by subtracting the DC index of the data center 11 that is the switching destination candidate from the DC index of the data center 11 that is the switching source in the index information 122.

The extracting unit 133 extracts the data center 11 that is the switching destination based on the estimated load values calculated by the calculating unit 132 and the time zone at the position where the data center 11 is located. For example, the extracting unit 133 extracts the data center with the estimated load value that is lower than that of the data center that is the switching source as the data center that is the switching destination, among the plurality of data centers 11. The extracting unit 133 excludes any data center, among the plurality of data centers 11, having the number of possible users smaller than that of the data center that is the switching source when extracting the data center that is the switching destination. For example, the extracting unit 133 uses the index information 122 stored in the storage unit 120 to compare the DC index of the data center that is the switching source and the DC index of the data center that is the switching destination, to extract the data center having a DC index lower than that of the data center that is the switching source, as the data center that is the switching destination. When there are a plurality of data centers that are switching candidates, for example, the extracting unit 133 prioritizes a data center that is located in a time zone position having a small number of users among the data centers having an estimated value of load lower than that of the data center that is the switching source. For example, when one day is divided into four portions including the early morning time from 4:00 to 8:00, the daylight time from 8:00 to 17:00, the evening time from 17:00 to 22:00, and the late night time from 22:00 to 4:00, the extracting unit 133 prioritizes the data centers in order according to whether the current time falls in the early morning time, the late night time, the evening time, and the daylight time.

The extracting unit 133 may set the task with the biggest difference in the estimated load value with another data center among the tasks processed by data center that is the switching source, as the task to be switched when extracting the data center that is the switching destination. For example, the extracting unit 133 compares the DC index of the switching source data center and the DC index of the switching destination data center calculated for each task by the calculating unit 132, and specifies the task with the biggest difference as the task to be switched. The extracting unit 133 then extracts the data center that is the switching destination for switching the specified task.

The extracting unit 133 may extract the data center that is the switching destination when, for example, the load on the data center currently being used by the users is equal to or greater than a predetermined threshold. For example, the extracting unit 133 extracts the data center that is the switching destination when information indicating that the data center 11 has a heavy load is received by the receiving unit 131.

The transmitting unit 134 transmits various types of information to the data center 11. For example, the transmitting unit 134 transmits information pertaining to the data center 11 that is the switching destination extracted by the extracting unit 133, to the management terminal 200. As a result, the management terminal 200 receives the information pertaining to the data center 11 that is the switching destination from the information processing apparatus 100. As a result, an administrator managing the operations of the data center system 1 is able to select and switch to an access destination suited to the users so that the users will be able to use a favorable network. When not even one data center 11 that is a switching destination can be extracted by the extracting unit 133, the transmitting unit 134 transmits the fact that a revision or expansion of the configuration of the entire system is desired to the management terminal 200.

Moreover, the transmitting unit 134 may transmit a migration instruction for migrating a task processed by the data center 11 that is the switching source to the data center 11 that is the switching destination. For example, the transmitting unit 134 transmits, to the data center 11 that is the switching source, a migration instruction for migrating a virtual machine (VM) for executing the task to be switched to the data center 11 that is the switching destination extracted by the extracting unit 133. As a result, the data center 11 that is the switching source receives the migration instruction from the information processing apparatus 100 and is able to execute the migration of the virtual machine for executing the task to be switched.

Figure 6:
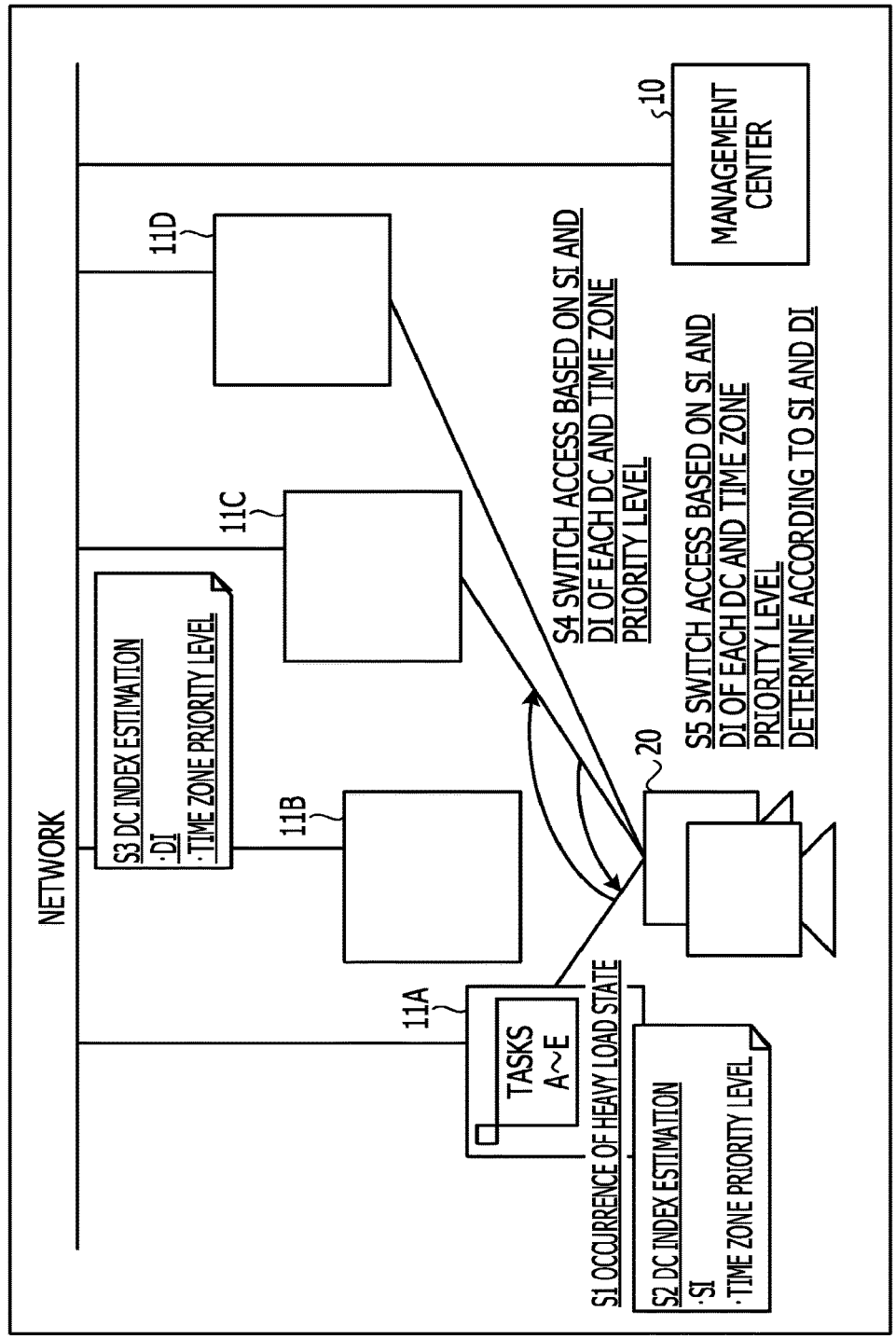
FIG. 6 illustrates an example of a flow of a switching process in a data center system.

An explanation of the flow of the switching process performed by the data center system 1 will be discussed with reference to FIGS. 3 to 6. FIG. 6 illustrates an example of a flow of the switching process in the data center system. In the examples in FIGS. 3 to 6, the data center system 1 is assumed to have the management center 10 and the data centers 11A to 11D which are respectively located in "Japan", "China", "Germany", and the "United States". In the example in FIG. 6, a user operates a user terminal 20 to conduct the tasks A to E by using the "Japan" data center 11A.

First, the "Japan" data center 11A that is the switching source detects a heavy load state because the activity rate of the CPU and the activity rate of the memory in the server are both "90" which is equal to or greater than the predetermined threshold as illustrated in FIG. 3 (S1). The "Japan" data center 11A then transmits information indicating the heavy load state to the management center 10. As a result, the information processing apparatus 100 in the management center 10 receives the information indicating that the "Japan" data center 11A is in a heavy load state.

Next, the information processing apparatus 100 in the management center 10 determines whether to switch the tasks A to E that use the "Japan" data center 11A, to an access destination in the "China", "Germany", or "United States" data centers 11B to 11D. The information processing apparatus 100 then specifies which task is to be processed when switching the access destination. For example, the information processing apparatus 100 first confirms, for each task processed by the data center 11A that is the switching source, whether the numbers of possible users of the data centers 11B to 11D that are switching destinations satisfy a condition. For example, the information processing apparatus 100 determines whether the sum of the number of current users in the data center 11B and the number of users of the task to be switched is greater than the number of possible users of the data center 11B that is the switching destination. In this case, the information processing apparatus 100 excludes, from the switching destination candidates, the data center in which the sum of the number of current users in the data center 11B that is the switching destination and the number of users of the task to be switched is greater than the number of possible users of the data center 11B that is the switching destination. In the example in FIG. 3, the sum of the number of current users, which is "1500", and the number of users of the task A, which is "2000", in the "China" data center 11B is "3500". Therefore, because the sum of the number of current users of the "China" data center 11B and the number of users of the task A being 3500 is less than the number of possible users of the "China" data center 11B which is 5000, the information processing apparatus 100 does not exclude the "China" data center 11B from the switching destination candidates. Similarly, the sums of the number of current users and the number of users of the task A in the "Germany" and "United States" data centers 11C to 11D are both smaller than the respective numbers of possible users. Therefore, the information processing apparatus 100 does not exclude the "Germany" and "United States" data centers 11C to 11D from the switching destination candidates.

Next, the information processing apparatus 100 obtains the latency, the server CPU activity rate, the server memory activity rate, the storage controller busy rate, the disk busy rate, and the busy tendency of the data center 11A that is the switching source from the data center information 121 stored in the storage unit 120. The information processing apparatus 100 then uses the obtained information to calculate an SI of "28.0" which is the DC index of the task A in the data center 11A that is the switching source as illustrated in FIG. 4 (S2).

Moreover, the information processing apparatus 100 obtains the latency, the server CPU activity rate, the server memory activity rate, the storage controller busy rate, the disk busy rate, and the busy tendency of the data center 11B that is the switching destination from the data center information 121. The information processing apparatus 100 then uses the obtained information and the number of possible users and the number of current users of the data center 11B that is the switching destination to calculate the DI of "32.7" which is the DC index of the task A in the data center 11B that is the switching destination (S3). Moreover, the information processing apparatus 100 calculates the difference of "−4.7" by subtracting the DI of the task A in the data center 11B that is the switching destination from the SI of the task A in the data center 11A that is the switching source. Similarly, the information processing apparatus 100 calculates the DIs of the task A in the data centers 11C to 11D that are switching destinations, and calculates the differences by subtracting the DIs of the task A in the data centers 11C to 11D that are switching destinations from the SI of the task A in the data center 11A that is the switching source.

Moreover, the information processing apparatus 100 calculates the SIs and the DIs of the tasks B to E processed by the data center 11A that is the switching source and the differences derived by subtracting the DIs from the SIs by repeating the above steps S2 to S3. When no data center that is a switching destination can be found that satisfies conditions of the number of possible users, the information processing apparatus 100 transmits the fact that a revision or expansion of the configuration of the entire system is desired to the management terminal 200.

Next, the information processing apparatus 100 extracts the task to be switched and the data center that is the switching destination. In the example in FIG. 4, the information processing apparatus 100 sets the task E as the switch candidate of the task E because the difference between the SI and the DI of "214.6", which is a combination of switching the task E to the United States data center 11D, is the biggest, when extracting the United States data center 11D. In this case, the difference of "211.8" which is the difference between the SI and the DI which is a combination of switching the task E to the Germany data center 11C is within a predetermined range (e.g., −20%) from the biggest combined difference of "214.6". As a result, the information processing apparatus 100 also extracts the Germany data center 11C as a candidate for switching the task E. The predetermined range is set beforehand as an appropriate value by the administrator and the like.

If the extracted switching destination data center candidate is one in this case, the information processing apparatus 100 determines that the one candidate is the data center to be switched. Conversely, if there are a plurality of extracted candidates for the switching destination data center, the information processing apparatus 100 refers to the time zone priority levels of each of the candidate data centers and determines that the data center candidate with the highest time zone priority level is the data center to be switched. In the example in FIG. 5, the time zone priority level of "2" for the Germany data center 11C is a value lower than the time zone priority level "3" for the United States data center 11D and thus is a higher priority level. As a result, the information processing apparatus 100 determines that the Germany data center 11C having the highest time zone priority level is the data center to be switched among the United States data center 11D and the Germany data center 11C that are the switch candidates for the task E.

The information processing apparatus 100 then automatically switches the access destination of the task E to the Germany data center 11C that has been determined as the switching destination (S4). For example, the information processing apparatus 100 transmits the migration instruction to the data center 11A that is the switching source. The data center 11A that is the switching source then migrates the task E to be switched to the data center 11C that is the switching destination based on the received migration instruction. The information processing apparatus 100 may transmit the information pertaining to the determined data center to be switched to the management terminal 200 so that the administrator performs the access destination switching. Moreover, when no data center that is a switching destination can be found, the information processing apparatus 100 transmits the fact that a revision or expansion of the configuration of the entire system is desired to the management terminal 200.

When the heavy load state of the Japan data center 11A that was the switching source is settled, the information processing apparatus 100 switches the access destination back (S5). For example, the Japan data center 11A that was the switching source continuously monitors the heavy load state. When the elimination of the heavy load state is detected, the Japan data center 1A then notifies the information processing apparatus 100 about the elimination of the heavy load state. Next, the information processing apparatus 100 that receives the notification determines whether to switch the access destination back by comparing the DC index of the data center 11C that is the switching source and the DC index of the data center 11A that is the switching destination using the same procedures as in steps S2 to S4. However, the information processing apparatus 100 calculates only the DC index of the data center 11A that has detected the elimination of the heavy load when calculating the DC indexes of the switching destination data centers in step S3. In the examples in FIGS. 3 to 6, the information processing apparatus 100 switches the access destination of the task E back to the Japan data center 11A when the DC index of the Japan data center 11A is lower than the DC index of the Germany data center 11C. For example, the information processing apparatus 100 transmits the migration instruction to the data center 11C that is the switching source. The data center 11C that is the switching source then migrates the task E to be switched to the data center 11A that is the switching destination based on the received migration instruction.

[Hardware Configuration of Data Center]

Figure 7:
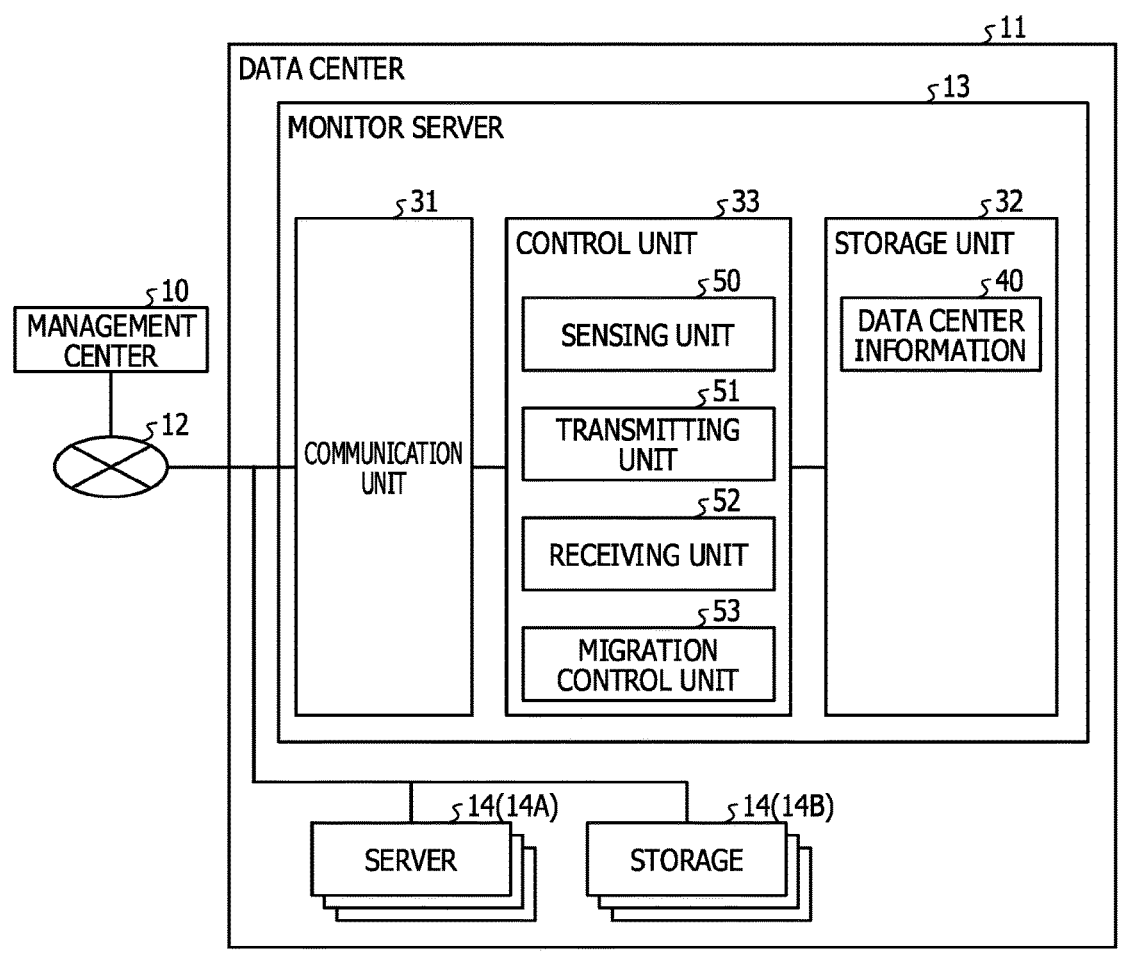
FIG. 7 illustrates a functional configuration of a data center according to the embodiment.

Next, a functional configuration of the data center 11 will be explained with reference to FIG. 7. FIG. 7 illustrates a functional configuration of the data center according to the embodiment.

The data center 11 has a monitor server 13, a plurality of servers 14A, and a plurality of storages 14B. The plurality of servers 14A and the plurality of storages 14B are monitored by the monitor server 13 to determine whether or not a fault has occurred, and are referred to as a monitored device 14 when no differentiation is made between the plurality of servers 14A and the plurality of storages 14B. The monitor server 13 and the plurality of monitored devices 14 are, for example, connected by a network inside the data center 11 and are able to communicate. The network inside the data center 11 is connected in a communicable manner to the network 12 thus enabling communication with the management center 10 and with other data centers 11 through the network 12. While one monitor server 13 is depicted in the example in FIG. 7, there may be two or more monitor servers 13.

The monitor server 13 is, for example, a server device for monitoring the monitored devices 14. For example, the monitor server 13 monitors whether or not a fault has occurred in the monitored devices 14.

The servers 14A are, for example, server devices for providing various types of services to the users. For example, the servers 14A are physical servers that operate virtual machines that are virtualized computers and provided various types of services to the users, and are, for example, server computers. For example, the servers 14A execute a server virtualization program for executing various types of tasks to be processed by the data centers 11. As a result, the servers 14A operate a plurality of virtual machines on a hyperserver and operate various types of task systems by operating application programs corresponding to the various types of tasks on the virtual machines. Systems for tasks A to E are operated in the example in FIG. 8. Moreover, the storages 14B are storage devices for providing a service for storing various types of information obtained by the users for example.

[Monitor Server Configuration]

A configuration of the monitor server 13 according to the embodiment will be discussed next. As illustrated in FIG. 7, the monitor server 13 has a communication unit 31, a storage unit 32, and a control unit 33. The monitor server 13 may have other functional units that are provided beforehand in a computer in addition to the functional units depicted in FIG. 7. For example, the monitor server 13 may have a display unit for displaying various types of information and an input unit for inputting various types of information.

The communication unit 31 is realized, for example, by a NIC. The communication unit 31 is connected by a wire or wirelessly to the network 12 for example. The communication unit 31 transmits and receives information to and from the management center 10 and another data center 11 over the network 12. Moreover, the communication unit 31 transmits and receives information with the monitored devices 14, for example, through the network inside the data center 11.

The storage unit 32 is a storage device for storing various types of data. The storage unit 32 is, for example, a storage device such as a hard disk, an SSD, or an optical disk. The storage unit 32 may be a semiconductor memory such as a RAM, a flash memory, or a NVSRAM and the like that is capable of rewriting data.

The storage unit 32 stores an OS and various types of programs that are executed by the control unit 33. For example, the storage unit 32 stores various types of programs including a program for executing a migration control process as described below. Moreover, the storage unit 32 stores various types of data to be used by the programs executed by the control unit 33. For example, the storage unit 32 stores data center information 40.

The data center information 40 is data for storing information pertaining to the data centers 11. For example, the number of users that can use each data center, the number of users currently using each data center, latency, server activity rate, storage busy rate, and information indicating tendencies for busy states are stored in the data center information 40.

FIG. 8 illustrates an example of a data configuration of the data center information. As illustrated in FIG. 8, the data center information 40 has fields such as "data center name", "number of possible users", "number of current users", "number of users per task", and "latency per task". The data center information 40 also includes fields such as "server CPU activity rate", "server memory activity rate", "storage controller busy rate", "storage disk busy rate", and "busy tendency".

The data center name field is a region for storing identification information for identifying the data centers 11. For example, the name of the country where the data center 11 is located is stored as the identification information in the data center name field. The field for the number of possible users is a region for storing the number of users that can use the data center 11. The field for the number of current users is a region for storing the number of users that are currently using the data center. The field for the number of users per task is a region for storing the number of users that are currently using each task. The latency per task field is a region for storing the communication time on a path for communication with another data center 11 for each task.

The server CPU activity rate field is a region for storing the usage condition of the CPU of the server in the data center 11. The server memory activity rate field is a region for storing the usage condition of the memory provided in a server in the data center 11. The storage controller busy rate field is a region for storing the busy rate of the controller provided in a storage in the data center 11. The storage disk busy rate field is a region for storing the busy rate of the disk provided in a storage in the data center 11. The busy tendency field is a region for storing an index indicating the tendency of the data center 11 to enter a busy state.

In the example in FIG. 8, the number of possible users of the data center 11A that is located in "Japan" is indicated as "12000". Moreover, the number of current users of the data center 11 that is located in "Japan" is indicated as "8000". Moreover, the number of current users of the "task A (Japan)" of the data center 11 that is located in "Japan" is indicated as "2000". The latency between the data center 11 located in "Japan" and the data center 11 located in "China" is indicated as "2.0". Moreover, the server CPU activity rate of the data center 11 that is located in "Japan" is indicated as "90%". The server memory activity rate of the data center 11 that is located in "Japan" is indicated as "90%". The storage controller busy rate of the data center 11 that is located in "Japan" is indicated as "50%". The storage disk busy rate of the data center 11 that is located in "Japan" is indicated as "50%". The busy tendency of the data center 11 that is located in "Japan" is indicated as "10".

Returning to FIG. 7, the control unit 33 is a device for controlling the monitor server 13. An electronic circuit such as a CPU or a MPU, or an integrated circuit such as an ASIC or an FPGA may be used as the control unit 33. The control unit 33 has an internal memory for storing control data and programs that prescribe various operating procedures, and the control unit 33 executes various types of processing using the control data and the programs. The control unit 33 functions as various types of processors due to the operations of the various types of programs. For example, the control unit 33 has a sensing unit 50, a transmitting unit 51, a receiving unit 52, and a migration control unit 53.

The sensing unit 50 senses the operating conditions of the data center 11. For example, the sensing unit 50 detects a heavy load state of the data center 11. For example, the sensing unit 50 detects the heavy load state when a load applied to the data center 11 is equal to or greater than a predetermined threshold. As one example, the sensing unit 50 detects the heavy load state when the server activity rate and the memory activity rate of the data center 11 are 90% or greater.

The transmitting unit 51 transmits information indicating the heavy load state to the management center 10 when the heavy load state of the data center 11 is detected by the sensing unit 50. Moreover, the transmitting unit 51 periodically transmits information such as the number of possible users, the number of current users, the latency and the number of users per business, the server CPU activity rate, the server memory activity rate, the storage controller busy rate, the disk busy rate, and the busy tendency to the management center 10.

The receiving unit 52 receives various types of information transmitted by the management center 10. For example, the receiving unit 52 receives, from the management center 10, information pertaining to the task to be switched and the data center that is the switching destination when the access destination is switched. Moreover, the receiving unit 52 receives the migration instruction from the information processing apparatus 100.

The migration control unit 53 conducts the migration of the tasks to be processed by the data center 11. For example, the migration control unit 53 migrates the virtual machine executing the task to be switched in the data center 11 that is the switching source, to the data center 11 that is the switching destination. The migration control unit 53 migrates the virtual machine when the migration instruction from the information processing apparatus 100 is received by the receiving unit 52. In the examples in FIGS. 3 to 5, when the migration instruction is received, the migration control unit 53 migrates the virtual machine executing the task E in the data center 11A that is the switching source to the data center 11C that is the switching destination. As a result, the migration control unit 53 is able to automatically switch the task to be switched of the data center 11 that is the switching source to the data center 11 that is the switching destination.

[Flow of Data Center System Processing]

Figure 9:
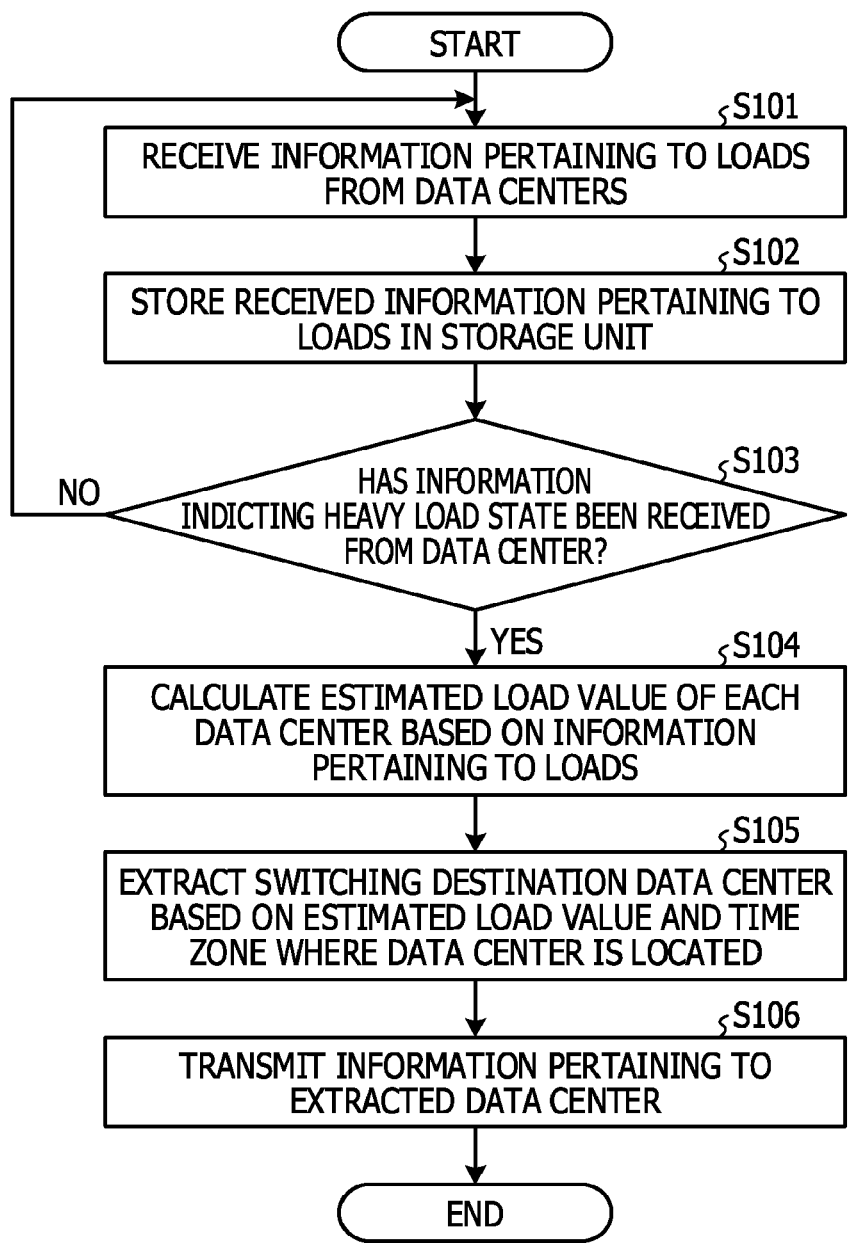
FIG. 9 is a flow chart depicting an example of switching processing.

Next, a flow of the processing by the information processing apparatus 100 according to the embodiment is discussed based on FIG. 9. FIG. 9 is a flow chart depicting an example of switching processing.

First, the information processing apparatus 100 receives information pertaining to loads from each of the plurality of data centers 11 in the data center system 1 (S101). For example, the information processing apparatus 100 receives the number of possible users, the number of current users, the busy tendency, the CPU activity rate and the memory activity rate of the server, the controller busy rate and the disk busy rate of the storage, and the number of users and the latency of the applicable task as the information pertaining to the loads. The information processing apparatus 100 then stores the received information pertaining to the loads in the storage unit 120 (S102).

Moreover, the information processing apparatus 100 determines whether information indicating a heavy load state has been received from the data centers 11 (S103). If the information processing apparatus 100 does not receive the information indicating the heavy load state from the data centers 11 (S103: No), the steps S101 to S103 are repeated. Conversely, if the information processing apparatus 100 receives the information indicating a heavy load state from the data centers 11 (S103: Yes), the information processing apparatus 100 calculates the estimated load values of the data centers based on the information pertaining to the loads (S104). For example, the information processing apparatus 100 calculates the DC index as the estimated load value for each task processed by the data center 11 that is the switching source based on the delay time of the data center, the server activity rate, the busy rate of the storage, or the tendency to enter the busy state.

The information processing apparatus 100 then extracts the data center 11 that is the switching destination based on the calculated estimated load values and the time zone at the position where the data center 11 is located (S105). For example, the information processing apparatus 100 extracts the data center with an estimated load value that is lower than that of the data center that is the switching source as the data center that is the switching destination, among the plurality of data centers 11. For example, the information processing apparatus 100 uses the index information 122 stored in the storage unit 120 to compare the DC index of the data center that is the switching source and the DC indexes of the data centers that are switching destinations, to extract the data center having a DC index lower than that of the data center that is the switching source, as the data center that is the switching destination. When there are a plurality of data centers that are switching candidates in this case, the information processing apparatus 100 prioritizes the data center that is located in a time zone position having a small number of users among the data centers having the estimated load value lower than that of the data center that is the switching source, and extracts the prioritized data center as the data center that is the switching destination.

The information processing apparatus 100 then transmits the information pertaining to the extracted data center 11 that is the switching destination to the management terminal 200 (S106). As a result, the management terminal 200 receives the information pertaining to the data center 11 that is the switching destination from the information processing apparatus 100. When not even one data center 11 that is a switching destination can be extracted by the information processing apparatus 100, the information processing apparatus 100 transmits the fact that a revision or expansion of the configuration of the entire system is desired to the management terminal 200. Moreover, the information processing apparatus 100 may transmit a migration instruction to the data center 11 that is the switching source. In this case, the data center 11 that is the switching source then migrates the task to be switched to the data center 11 that is the switching destination based on the received migration instruction.

[Effects]

As discussed above, the information processing apparatus 100 according to the present embodiment has the receiving unit 131, the calculating unit 132, and the extracting unit 133. The receiving unit 131 receives information pertaining to loads from each of the plurality of data centers 11 located in a plurality of positions. The calculating unit 132 calculates the estimated load values of the data centers 11 based on the information pertaining to the loads received by the receiving unit 131. The extracting unit 133 extracts the data center 11 that is the switching destination based on the estimated load values calculated by the calculating unit 132 and the time zones at the positions where the data centers 11 are located. As a result, the information processing apparatus 100 is able to extract a data center 11 having a light load and favorable network conditions based on the estimated load value and the time zone where the data center 11 is located. Consequently, a reduction in performance of the data center that is the switching destination can be suppressed. As a result, the information processing apparatus 100 is able to suppress a reduction in performance due to the switching in comparison to when the data center that is the switching destination is determined based only on distance. For example, the information processing apparatus 100 is able to reduce the wasteful switching of access destinations by being able to suppress a reduction in performance when the data center that is the switching destination does not have a heavy load at the current time but consequently becomes a switching destination data center having a heavy load due to the switching. Moreover, the information processing apparatus 100 is able to select a switching destination that is more suitable than in the case of simply comparing the loads because the estimated load value conditions when a task is switched is taken into account. As a result, the information processing apparatus 100 is able to effectively suppress a reduction in performance by switching and is able to guarantee a favorable performance response to the users. Moreover, the information processing apparatus 100 is able to select the data center appropriate for the users by considering the time zones in each of the countries where the data centers are located. Further, the information processing apparatus 100 is able to optimize the entire data center system including the data centers located in a plurality of bases without settling the load on a specific data center.

For example, the extracting unit 133 in the information processing apparatus 100 according to the present embodiment extracts the data center with the estimated load value that is lower than that of the data center that is the switching source as the data center that is the switching destination, from the plurality of data centers 11. As a result, the information processing apparatus 100 is able to select an access destination suited to the users by being able to select a data center with a lower load than the data center that is the switching source.

Moreover, the extracting unit 133 in the information processing apparatus 100 according to the present embodiment prioritizes a data center that is located in a time zone position having a small number of users among the data centers having an estimated load value lower than that of the data center that is the switching source, and extracts the prioritized data center as the data center that is the switching destination. As a result, the information processing apparatus 100 is able to consider the time difference of the positions where the data centers 11 are located and thereby extract the data center that is the access destination suited to the users even when the positions where the data centers are located are in different countries. For example, the information processing apparatus 100 prioritizes a data center in an early morning or late night time zone over one in a daylight time or evening time zone and selects that data center and thus is able to select an access destination having favorable network conditions.

Moreover, the calculating unit 132 in the information processing apparatus 100 according to the present embodiment calculates the estimated load value for each task to be processed by the data center that is the switching source. The extracting unit 133 sets the task with the biggest difference in the estimated load value with another data center among the tasks processed by data center that is the switching source, as the task to be switched when extracting the data center that is the switching destination. As a result, the information processing apparatus 100 is able to switch the task having the biggest effect in reducing the load as a result of the switching and thus effectively reduce the load of the data center 11 that is the switching source.

The extracting unit 133 in the information processing apparatus 100 according to the present embodiment extracts the data center that is the switching destination when the load on the data center currently being used by the users is equal to or greater than the predetermined threshold. As a result, the information processing apparatus 100 is able to extract the data center 11 that is the switching destination when the data center 11 that is the switching source has entered the heavy load state, and thus is able to constantly provide a favorable response with a network environment that is favorable for the users.

The calculating unit 132 in the information processing apparatus 100 according to the present embodiment calculates the estimated load value based on the delay time of the data center, the server activity rate, the busy rate of the storage, or the tendency to enter the busy state. As a result, the information processing apparatus 100 is able to extract the data center 11 that is the switching destination in consideration of the busy state of the data center 11 and thus is able to select the access destination having favorable network conditions. For example, the information processing apparatus 100 reduces the priority level for a switching destination candidate when the data center that is the switching destination candidate is expected to enter the busy state, and raises the priority level if a low busy rate is expected, thereby optimizing the entire data center system.

The constituent elements of the illustrated parts are functional and conceptual perspectives and do not have to be configured physically as illustrated. That is, all or some of the components may be functionally or physically decentralized or integrated according to each kind of load and usage without the specific states of the decentralization or integration of the devices being limited to the drawings. For example, the processing units including the receiving unit 131, the calculating unit 132, the extracting unit 133, and the transmitting unit 134 may be integrated as appropriate. Furthermore, the processing of each processing unit may be divided among the processing of an appropriate number of processing units. Moreover, all or a part of the processing functions implemented by the components may be performed by a CPU and a program that is analyzed and executed by the CPU, or may be implemented as hardware with wired logic.

[Information Processing Program]

Figure 10:
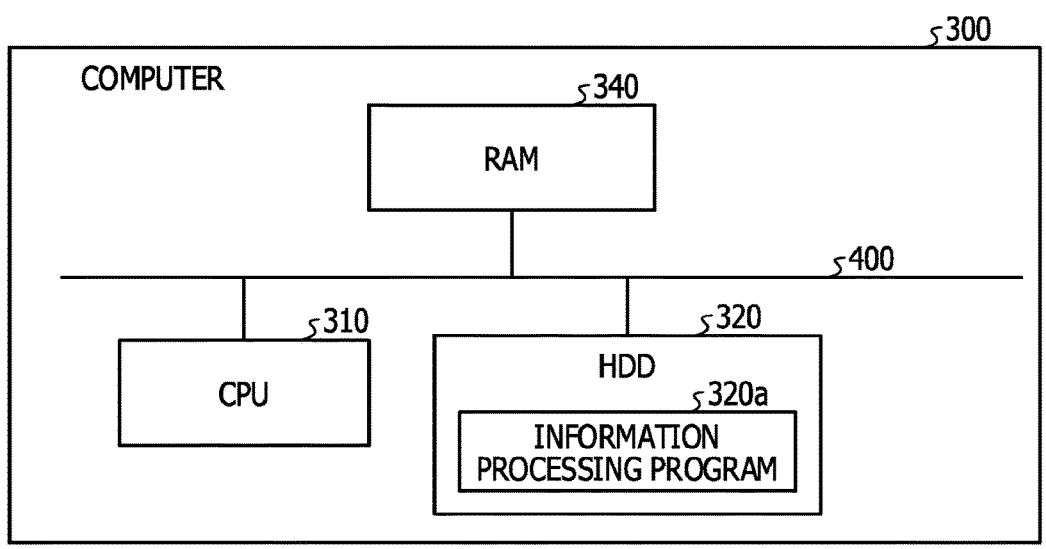
FIG. 10 illustrates a computer that executes an information processing program.
Figure 11:
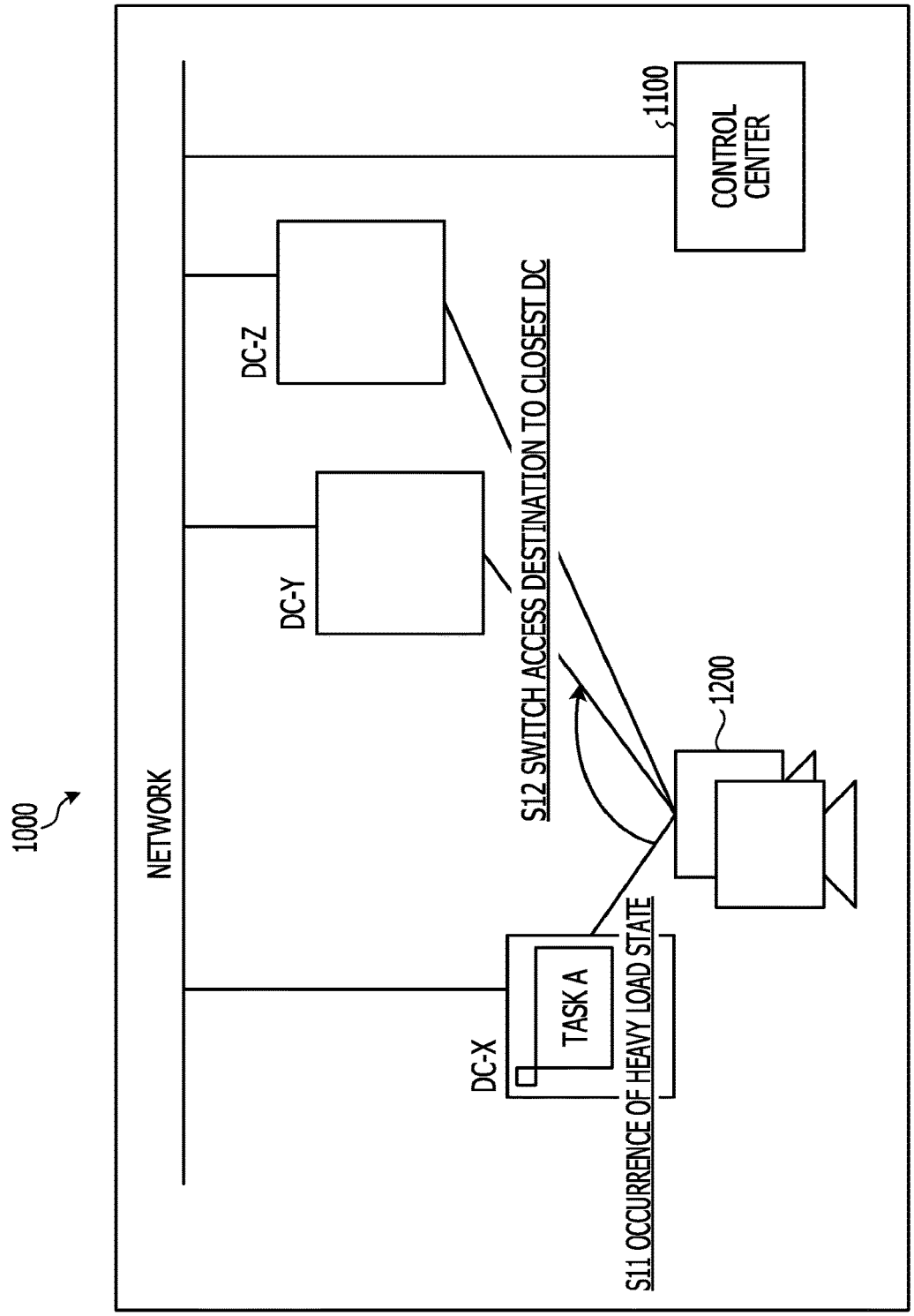
FIG. 11 illustrates an example of an information processing system.

The various types of processing described in the above embodiment may be realized by executing a program prepared in advance using a computer system such as a personal computer or a workstation. In the following description, an example of a computer executing a program that has functions similar to the above embodiments will be described. FIG. 10 illustrates a computer that executes an information processing program.

As illustrated in FIG. 10, a computer 300 has a central processing unit (CPU) 310, a hard disk drive (HDD) 320, and a random access memory (RAM) 340. The CPU 310, the HDD 320, and the RAM 340 are connected to each other via a bus 400.

An information processing program 320a for demonstrating the functions similar to the above receiving unit 131, the calculating unit 132, the extracting unit 133, and the transmitting unit 134, is stored in the HDD 320. The information processing program 320a may be divided as appropriate.

The HDD 320 stores various types of information. For example, the HDD 320 stores various types of data used by the OS and used for switching processing.

The CPU 310 executes the operations similar to the processing units of the embodiment by reading and executing the information processing program 320a from the HDD 320. That is, the information processing program 320a executes operations similar to the receiving unit 131, the calculating unit 132, the extracting unit 133, and the transmitting unit 134.

The above information processing program 320a is not needed to be stored in the HDD 320 from the beginning.

For example, a program is stored in a "portable physical medium" such as a flexible disk (FD), a CD-ROM, a DVD disk, a magneto-optic disc, or an IC card and the like that can be inserted into the computer 300. The computer 300 then may read the program from the medium to execute the program.

Furthermore, the program may be stored on "another computer (or server)" connected to the computer 300 via a public communication line, the Internet, a LAN, or a WAN and the like. The computer 300 then may read the program from the other computer (or server) to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
receive, from each of a plurality of data centers located in a plurality of positions, load information pertaining to a load of each data center;
receive information that a load of a first data center of the plurality of data centers is equal to or greater than a threshold;
calculate an estimated load value for each of the plurality of data centers based on the received load information;
select a second data center based on the estimated load value and a time zone of the position where the first data center is located when the load of the first data center is equal to or greater than the threshold;
control the second data center to execute a part of the load of the first data center; and
return the part of the load of the first data center to the first data center from the second data center when receiving information that the load of the first data center is less than the threshold.

2. The information processing apparatus according to claim 1, wherein the processor is configured to:
select a data center with the estimated load value lower than the first data center, as the second data center, among the plurality of data centers.

3. The information processing apparatus according to claim 2, wherein the processor is configured to:
select, as the second data center, a data center in a time zone with a low number of requested processes among the data centers having the estimated load value lower than the first data center.

4. The information processing apparatus according to claim 2, wherein the processor is configured to:
transmit, to the first data center, a migration instruction to migrate a virtual machine which executes the part of the load of the first data center the second data center requested process.

5. The information processing apparatus according to claim 2, wherein the processor is configured to:
calculate the estimated load value for each of tasks processed by the first data;
select a task, among the tasks, with which difference of the estimated load value between the first data center and another data center is the biggest as the part of the load of the first data center; and
control the another data center as the second data center to execute the selected task as the part of the load of the first data center.

6. The information processing apparatus according to claim 1, wherein the processor is configured to:
calculate the estimated load value for each of the plurality of data centers based on one of a delay time to execute a requested process in the respective data centers, an usage rate of processor included in the respective data centers, a busy rate of a storage included in the respective data centers, and the tendency to enter a busy state of the respective data centers.

7. A system comprising:
a plurality of data centers located in a plurality of positions; and
an information processing apparatus coupled with the plurality of data centers via a network and configured to manage the plurality of data centers, the information processing apparatus:
receives, from each of the plurality of data centers, load information pertaining to a load of each data center;
receives information that a load of a first data center of the plurality of data centers is equal to or greater than a threshold;
calculates an estimated load value for each of the plurality of data centers based on the received load information;
selects a second data center based on the estimated load value and a time zone of the position where the first data center is located when the load of the first data center is equal to or greater than the threshold;
controls the second data center to execute a part of the load of the first data center; and
returns the part of the load of the first data center to the first data center from the second data center when receiving information that the load of the first data center is less than the threshold.

8. A method comprising:
receiving, by a processor, from each of a plurality of data centers located in a plurality, of positions, load information pertaining to a load of each of the plurality of data centers;
receiving, by a processor, information that a load of a first data center of the plurality of data centers is equal to or greater than a threshold;
calculating, by the processor, an estimated load value for each of the plurality of data centers based on the received load information;
selecting, by the processor, a second data center based on the estimated load value and a time zone of the position where the first data center is located when the load of the first data center is equal to or greater than the threshold;
controlling, by the processor, the second data center to execute a part of the load of the first data center; and
returning the part of the load of the first data center to the first data center from the second data center when receiving information that the load of the first data center is less than the threshold.

9. The method according to claim 8, further comprising:
selecting, by the processor, a data center with the estimated load value lower than the first data center, as the second data center, among the plurality of data centers.

10. The method according to claim 9, further comprising:
selecting, by the processor, as the second data center, a data center in a time zone with a low number of requested processes among the data centers having the estimated load value lower than the first data center.

11. The method according to claim 9, further comprising:
transmitting, to the first data center, a migration instruction to migrate a virtual machine which executes the part of the load of the first data center to the second data center.

12. The method according to claim 9, further comprising:
calculating, by the processor, the estimated load value for each of tasks processed by the first data center;
extracting, by the processor, a task, among the tasks processed by the switching source data center, with which difference of the estimated load value between the first data center and another data center is the biggest as the part of the load of the first data center; and controlling, by the processor, the another data center as the second data center to execute the selected task as the part of the load of the first data center.

13. The method according to claim 8, wherein the estimated load value for each of the plurality of data centers is calculated based on one of a delay time to execute a requested process in the respective data centers, an usage rate of processor included in the respective data centers, a busy rate of a storage included in the respective data centers, and the tendency to enter a busy state of the respective data centers.

14. A non-transitory computer readable medium having stored therein a program that causes a computer to execute a process, the process comprising:
   receiving, from each of a plurality of data centers located in a plurality of positions, load information pertaining to a load of each of the plurality of data centers;
   receiving information that a load of a first data center of the plurality of data centers is equal to or greater than a threshold;
   calculating an estimated load value for each of the plurality of data centers based on the received load information;
   selecting a second data center based on the estimated load value and a time zone of the position where the first data center is located when the load of the first data center is equal to or greater than the threshold; and
   controlling the second data center to execute a part of the load of the first data center; and
   returning the part of the load of the first data center to the first data center from the second data center when receiving information that the load of the first data center is less than the threshold.

15. The non-transitory computer readable medium according to claim 14, wherein the process further comprising:
   selecting a data center with the estimated load value lower than the first data center, as the second data center, among the plurality of data centers.

16. The non-transitory computer readable medium according to claim 15, wherein the process further comprising:
   selecting, as the second data center, a data center in a time zone with a low number of requested processes among the data centers having the estimated load value lower than the first data center.

17. The non-transitory computer readable medium according to claim 15, wherein the process further comprising:
   transmitting, to the first data center, a migration instruction to migrate a virtual machine which executes the part of the load of the first data center to the second data center.

18. The non-transitory computer readable medium according to claim 15, wherein the process further comprising:
   calculating the estimated load value for each of tasks processed by the first data center;
   selecting a task, among the tasks processed by the switching source data center, with which difference of the estimated load value between the first data center and another data center is the biggest as the part of the load of the first data center; and
   controlling the another data center as the second data center to execute the selected task as the part of the load of the first data center task.

* * * * *